UNITED STATES PATENT OFFICE.

EDWARD J. DE SMEDT, OF WASHINGTON, DISTRICT OF COLUMBIA.

MANUFACTURE OF HYDRAULIC LIME AND HYDRAULIC CEMENT.

SPECIFICATION forming part of Letters Patent No. 260,546, dated July 4, 1882.

Application filed May 19, 1882. (No specimens.)

*To all whom it may concern:*

Be it known that I, EDWARD J. DE SMEDT, of the city of Washington, in the District of Columbia, have invented a certain new and useful Improvement in the Manufacture of Hydraulic Limes and Hydraulic Cements, of which the following is a specification.

Limes used for hydraulic limes and cements are usually produced by calcining limestones containing a certain quantity of silica ($SiO_3$) and alumina, ($Al_2O_3$,) expelling therefrom all the carbonic acid, ($CO^2$.) This process offers several decided disadvantages and objections. When the stone contains a slight excess of lime the cement will set so quickly that it is with difficulty put in place between bricks or in concrete before setting. Furthermore, it will not resist the disintegrating action of sea-water. The magnesia salts of the sea-water react on the lime and take its place with the effect of destroying the cohesion of the concrete. In order to avoid these defects the lime of the cement must not be caustic lime—that is to say, must not be entirely freed from carbonic acid, ($CO^2$,) but should retain about half of the same; or, in other words, should be a bibasic carbonate of lime. The proper theory of calcination may be thus formulated:

$$CaOCO^2 < {CaO \atop CO^2} > 2(CaO)CO^2 + CO^2 -$$ that is to say, carbonate of lime, which, when calcined in the ordinary way is decomposed into caustic lime and carbonic acid, will, by being kept in contact with carbonic acid during the operation of calcination at red heat be decomposed into bibasic carbonate of lime and carbonic acid.

A hydraulic lime or cement with bibasic carbonate of lime will be a slow-setting cement, and will produce a mortar which has much greater tensile strength than one containing caustic lime. This result has sometimes been accidentally and partially obtained by not completely calcining the limestone, or by exposing the lime or cement stone after calcination to the action of the air, by which it will, to a certain extent, become hydrated and absorb $CO^2$; but no positive, definite, and uniform results can be obtained in this way.

It is very desirable that there should be a process of manufacture or treatment by which the composition $2(CaO)CO^2$ can always be obtained, and which shall at the same time be simple and of such a nature as to be readily practiced. It is to this end that my invention is directed.

I have found that the desired result can be obtained by calcining at red heat magnesian limestone, hydraulic lime, or hydraulic-cement limestone in the presence of carbonic acid. The same result may be obtained by taking the stone calcined by ordinary process and reheating it while maintained in constant contact with carbonic acid. In each case the product is a bibasic carbonate of lime. This substance, even in a pure state has hydraulic properties, and is not readily soluble in water—much less so than caustic lime. When brought in contact with water no heat is emitted, nor does its bulk increase. In contact with $SiO^3$ the silica combines with the lime and forms a silicate of lime, making an excellent and superior quality of slow-setting hydraulic cement.

In practice I heat the lime or cement stones at the time of calcination or afterward to a red heat while maintaining them in contact with carbonic acid. The operation may be performed in calcining furnaces or kilns of ordinary types, and the carbonic acid used in the treatment can readily be obtained by taking it from the tops of furnaces used for calcining purposes and conducting it to and injecting it into the material to be treated or otherwise maintaining it in constant contact therewith.

The apparatuses referred to are well known to those skilled in the art to which my invention relates, and require no further description here.

What I claim, and desire to secure by Letters Patent, is—

The manufacture of hydraulic limes and cements from hydraulic lime and cement stone by heating said stone at the time of calcination or afterward while maintaining it in contact with carbonic acid during the heating operation, as hereinbefore set forth.

In testimony whereof I have hereunto set my hand this 19th day of May, 1882.

E. J. DE SMEDT.

Witnesses:
E. A. DICK,
WM. H. BATES.